United States Patent
Rämö

(10) Patent No.: US 8,228,294 B2
(45) Date of Patent: Jul. 24, 2012

(54) SYSTEM, METHOD AND COMPUTER PROGRAM FOR CONTROLLING A CURSOR

(75) Inventor: Kimmo Rämö, Espoo (FI)

(73) Assignee: Nokia Corporation, Espoo (FI)

( * ) Notice: Subject to any disclaimer, the term of this patent is extended or adjusted under 35 U.S.C. 154(b) by 940 days.

(21) Appl. No.: 12/223,545

(22) PCT Filed: Feb. 2, 2006

(86) PCT No.: PCT/IB2006/000705
§ 371 (c)(1), (2), (4) Date: Aug. 1, 2008

(87) PCT Pub. No.: WO2007/088410
PCT Pub. Date: Aug. 9, 2007

(65) Prior Publication Data
US 2009/0040182 A1  Feb. 12, 2009

(51) Int. Cl.
*G06F 3/033* (2006.01)
(52) U.S. Cl. .......... 345/162; 345/157; 345/160
(58) Field of Classification Search .......... 345/156–168, 345/173–178; 178/18.01–18.09
See application file for complete search history.

(56) References Cited

U.S. PATENT DOCUMENTS

| | | | |
|---|---|---|---|
| 4,782,327 A * | 11/1988 | Kley et al. | 341/2 |
| 4,935,728 A | 6/1990 | Kley | |
| 6,323,844 B1 | 11/2001 | Yeh et al. | |
| 6,329,978 B1 * | 12/2001 | Yeh et al. | 345/157 |
| 2005/0190144 A1 * | 9/2005 | Kong | 345/156 |

FOREIGN PATENT DOCUMENTS
EP  1 569 082  8/2005

* cited by examiner

*Primary Examiner* — Vijay Shankar
(74) *Attorney, Agent, or Firm* — Altston & Bird LLP

(57) ABSTRACT

A cursor control device is shown for enabling a user to input directional commands; a display for displaying a plurality of discrete areas and a cursor; a cursor controller for controlling the movement of the cursor in the display in response to the directional input commands, having: a first operational state in which a cursor is moved, in response to input directional commands from the cursor control device, within a first discrete area in a free-roaming manner and a second operational state in which a cursor is moved, in response to input directional commands from the cursor control device, in a discrete-roaming manner from discrete area to discrete area; and a user operable switching means for controlling the operational state of the cursor controller.

24 Claims, 4 Drawing Sheets

SYSTEM, METHOD AND COMPUTER PROGRAM FOR CONTROLLING A CURSOR

BACKGROUND

1. Technical Field

Embodiments of the present invention relate to cursor control. In particular, they relate to cursor control in a graphical user interface.

2. Description of Related Art

In graphical user interfaces with big displays and/or limited user input capabilities it can be difficult to move a cursor from an application window area, where, for example, text entry occurs to a control area, where a function can be performed. Control areas such as menus, toolbars, scrollbars, links etc are often located at the edges of the display or the application window area.

SUMMARY

It would be desirable to provide a user with improved cursor control.

According to one embodiment there is provided a system comprising: a cursor control device for enabling a user to input directional commands; a display for displaying a plurality of discrete areas and a cursor; a cursor controller for controlling the movement of the cursor in the display in response to the directional input commands, having: a first operational state in which a cursor is moved, in response to input directional commands from the cursor control device, within a first discrete area in a free-roaming manner and a second operational state in which a cursor is moved, in response to input directional commands from the cursor control device, in a discrete-roaming manner from discrete area to discrete area; and a user operable switching means for controlling the operational state of the cursor controller.

The system may also comprise a memory for storing location data recording the current location of the cursor in a first discrete area on switching from the first state of the cursor controller to the second state of the cursor controller, wherein the cursor controller is operable to subsequently automatically locate the cursor in the first discrete area in accordance with the stored location data.

According to another embodiment there is provided a cursor controller for controlling the movement of the cursor in the display in response to directional input commands, having: a first operational state in which a cursor is moved, in response to input directional commands from a cursor control device, within a first discrete area in a free-roaming manner; a second operational state in which a cursor is moved, in response to input directional commands from a cursor control device, in a discrete-roaming manner from discrete area to discrete area; and means for controlling the operational state of the cursor controller in response to user input.

According to another embodiment there is provided a method for controlling a cursor comprising: responding to input directional commands from a cursor control device by moving a cursor within a first discrete area in a free-roaming manner; detecting a first input from a user operable switching means; responding to input directional commands from a cursor control device by moving a cursor in a discrete-roaming manner from discrete area to discrete area; detecting a second input from a user operable switching means; and responding to input directional commands from a cursor control device by moving a cursor within a first discrete area in a free-roaming manner.

According to another embodiment there is provided a computer program comprising program instructions which when loaded into a processor enable a user to toggle between a first cursor control state in which a cursor is moved, in response to input directional commands, in a free-roaming manner and a second cursor control state, in which a cursor is moved, in response to input directional commands, in a discrete-roaming manner.

BRIEF DESCRIPTION OF THE DRAWINGS

For a better understanding of the present invention reference will now be made by way of example only to the accompanying drawings in which.

DETAILED DESCRIPTION OF EMBODIMENTS

Figure 1:
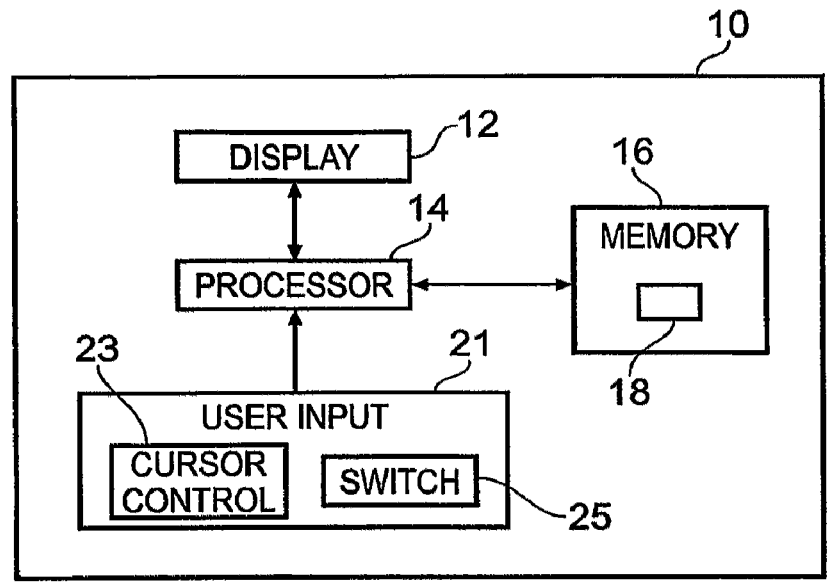
FIG. 1 illustrates a computer based system 10.

The figures illustrate a system 10 comprising: a cursor control device 23 for enabling a user to input directional commands; a display 12 for displaying a plurality of discrete areas 22 and a cursor 32; a cursor controller 14 for controlling the movement of the cursor 32 in the display 12 in response to the directional input commands from the cursor control device 23, having a first operational state in which a cursor 32 is moved, in response to input directional commands from the cursor control device 23, within a first discrete area 22 in a free-roaming manner and a second operational state in which a cursor 32 is moved, in response to input directional commands from the cursor control device 23, in a discrete-roaming manner from discrete area 22 to discrete area 22; and a user operable switching means 25 for controlling the operational state of the cursor controller 14.

FIG. 1 illustrates a computer based system 10 such as a personal computer, a personal digital assistant, a home entertainment center, a mobile cellular telephone or similar electronic device. The system is 'computer-based' as computer program instructions 18 stored in a computer readable medium such as a memory 16, control the operation of the system 10 when loaded into the processor 14. The computer program instructions 18 provide the logic and routines that enables the electronic device to perform the methods illustrated in FIGS. 2, 3 and 4 when executed on the processor 14.

The computer program instructions may arrive at the memory 16 via an electromagnetic carrier signal or be copied from a physical entity such as a computer program product, a memory device or a record medium such as a CD-ROM or DVD.

The system 10 comprises a processor 14, a memory 16 storing computer program instructions 18, a display 12, and user input devices 21 including a cursor control device 23 and a switch 25.

The cursor control device 23 is any suitable device for providing directional commands for controlling the movement of a cursor. The cursor control device 23 may be, for example, a joystick, a mouse, a trackball, a collection of keys for 4-way directional movement (e.g. N, S, W, E) or 8-way directional movement (e.g. N, NE, E, SE, S, SW, W, NW) etc. The cursor control device 23 may have associated selection button(s) or a selection action for selecting the area or region of the display at which cursor is currently located. A cursor 32 is an image generated on the display 12. It may be an arrow, a pointer, a flashing line, an image of a finger or any other suitable visually distinct marker. It may be used as part of a selection mechanism, as a pointer to a representation of an object on the display such as a portion of text, an icon, a button, or the like, which may be selected for instance by depressing a button.

The display 12 is used to present a graphical user interface (GUI) 20 such as those as illustrated in FIGS. 3 and 4. The GUI 20 has different discrete areas 22 for different functions. For example the discrete areas 22A are 'text' areas that are used, when selected, for text input and the discrete areas 22B are 'control' areas which, when selected, perform a control function associated with the selected area.

The processor 14 under the influence of the computer program 18 operates as a cursor controller. It receives the directional commands from the cursor control device 23 and, depending upon the operational state of the cursor controller converts the directional commands into either first display control signals that move the cursor 32 in the display 12 in a free-roaming manner or second display control signals that move the cursor 32 in the display 12 in a discrete-roaming manner.

Free-roaming movement involves movement of the cursor 32 in a manner that is independent of the location of the cursor 32 within the discrete area 22 it is located within. Typically, it involves movement of the cursor 32 a distance on the display that has a constant, linearly proportional relationship to the magnitude of an input directional command or commands. A user can therefore easily control the rate at which the cursor traverses the area 32 by controlling the magnitude or frequency of the directional commands that are input using the cursor control device 23.

Discrete roaming, in contrast to free-roaming, involves movement of the cursor in a manner that is dependent on the location of the cursor within the discrete area 22 it is located within, relative to other discrete areas. Discrete roaming typically involves movement of the cursor to the nearest discrete area in a direction corresponding to input directional commands. Thus the cursor hops from discrete area to discrete area with each directional input command.

The switch 25 is a user actuable switching device. It may be integrated with the cursor control device but is preferably separate, so that the switch 25 is operated by a user with one hand while the cursor control device 23 is operated by a user using the other hand. The switch 25 is used to toggle the operational state of the cursor controller as illustrated in FIG. 2A.

Figure 2A:
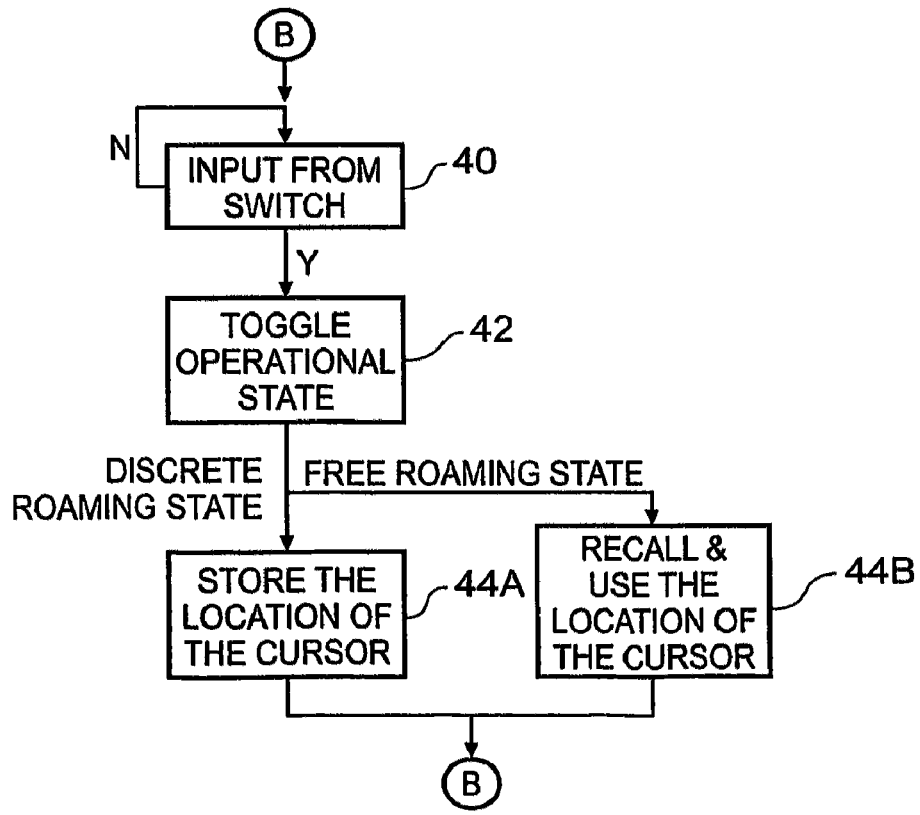
FIG. 2A illustrates how the switch 25 is used to toggle the operational state of the cursor controller.

In FIG. 2A, at step 40, the cursor controller detects an input from the switch 25 and proceeds to step 42. At step 42, the cursor controller toggles its operational state. If the cursor controller is in a first free-roaming operational state, it changes to a second discrete roaming operational state. If the cursor controller is in a second discrete roaming operational state, it changes to a first free roaming operational state.

The method then moves to step 44.

If the new operational state is the second discrete-roaming operational state, the method automatically stores at step 44A the current location of the cursor which was moved in a free-roaming manner prior to actuation of the switch 25. The location data for the cursor may be stored as an absolute X,Y co-ordinate of the display 12 or, alternatively as a relative x, y co-ordinate for the area in which the cursor is located along with an identifier of that area. The location of the cursor is stored in the memory 16 by the processor 14.

If the new operational state is the first free-roaming operational state, the method automatically accesses at step 44B the stored location data for the cursor and places the cursor at the corresponding location in the display 12.

Thus if the cursor is in a first location in a first discrete area when the cursor controller enters the second discrete roaming operational state, then despite cursor movement while in the second state, when the first free-roaming operational state is re-entered the cursor is repositioned at the first location in the first area.

Figure 2B:
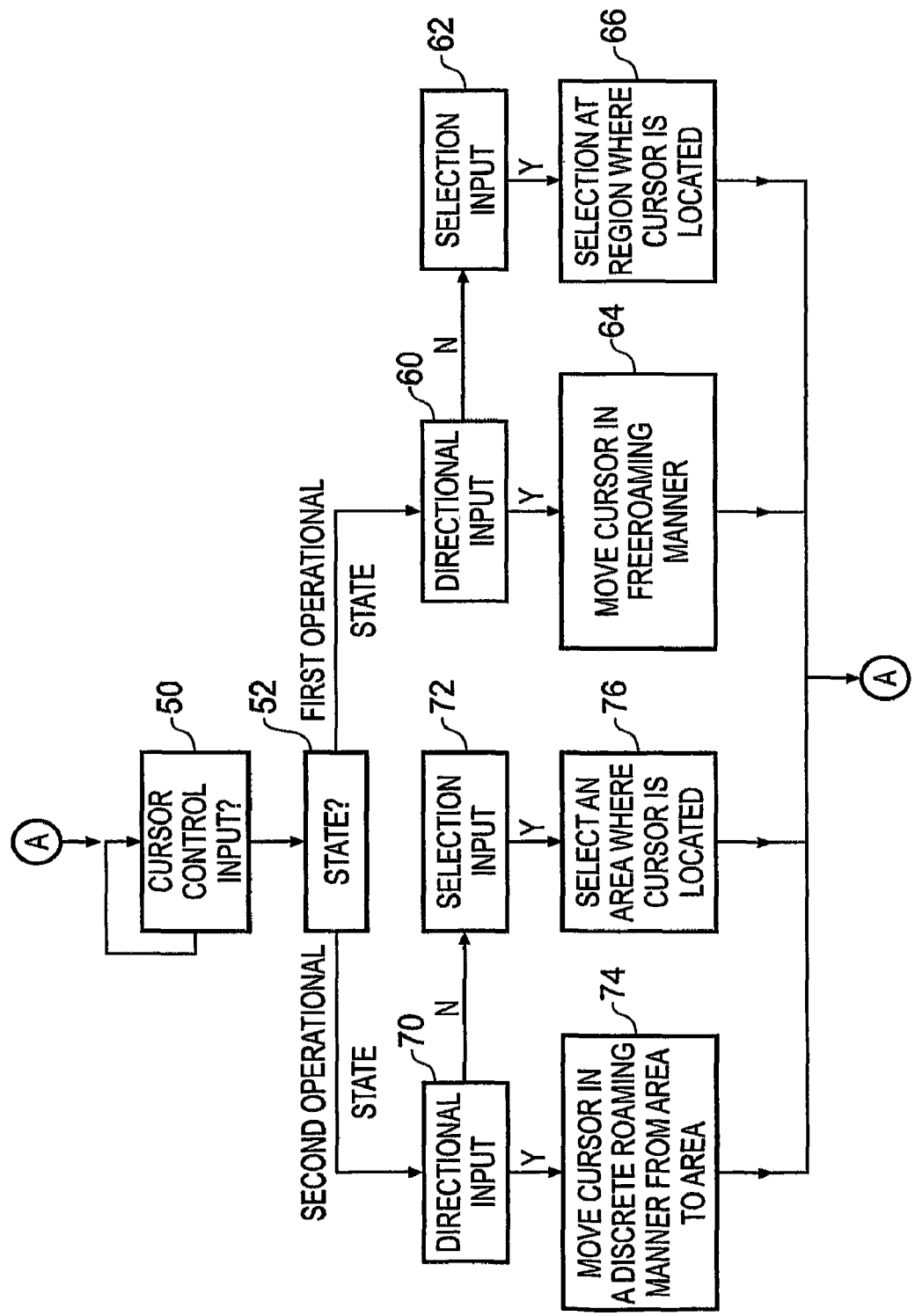
FIG. 2B illustrates how the cursor controller responds differently to directional commands from the cursor control device 23 depending upon the operational state of the cursor controller.

FIG. 2B illustrates how the cursor controller responds differently to directional commands from the cursor control device 23 depending upon the operational state of the cursor controller.

At step 50, a cursor control command is detected by the cursor controller (processor 14). In response, the method moves to step 52, where the operational state of the cursor controller is detected. If the cursor controller is in a first free roaming operational state the method branches to step 60 and if the cursor controller is in a second discrete roaming operational state the method branches to step 70.

At steps 60 and 62, it is detected whether the input from the cursor control device 23 is a directional command or a selection command.

If the input is a directional command, the method moves to step 64, where the cursor controller moves the cursor 32 in a free roaming manner. The cursor controller calculates the vector corresponding to the received directional commands and then controls the display so that the cursor 32 moves an amount in the display that is linearly proportional to that vector. The method then returns to step 50.

If the input is a selection command, the method moves to step 66, where the cursor controller selects the region where the cursor 32 is currently located. The method then returns to step 50.

At steps 70 and 72, it is detected whether the input from the cursor control device 23 is a directional command or a selection command.

If the input is a directional command, the method moves to step 74, where the cursor controller then moves the cursor 32 in a discrete roaming manner. The cursor controller calculates the vector corresponding to the received directional commands. It then identifies the nearest discrete area 22 that lies along the direction of the calculated vector or, if there is no such area 22, the nearest area 22 that is substantially in the direction of the calculated vector. Thus the cursor 32 hops from discrete area 22 to discrete area 22 with each directional input command.

If the input is a selection command, the method moves to step 76, where in one implementation no function is performed and in another implementation the cursor controller selects the area where the cursor 32 is currently located. The method then returns to step 50.

Figure 3A:
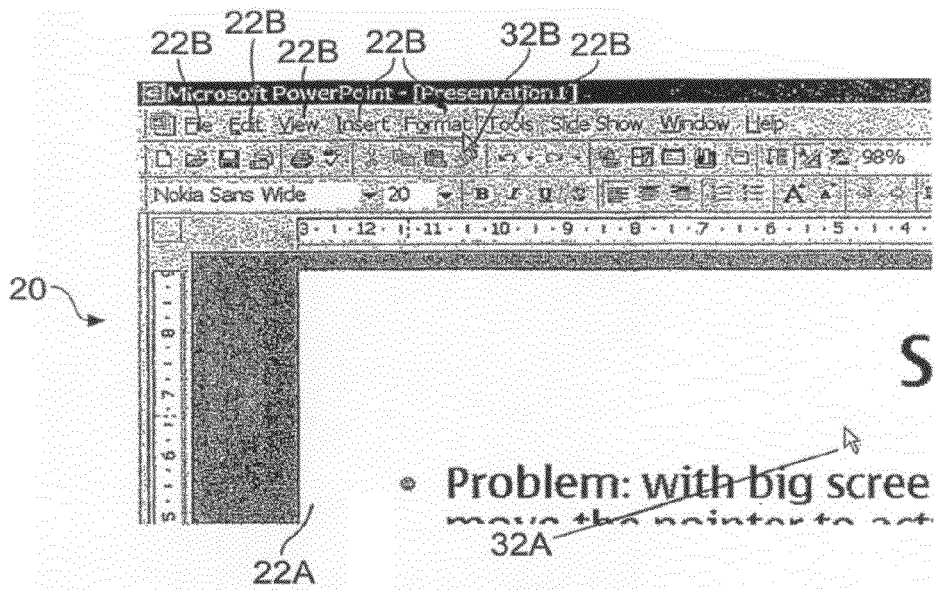
FIGS. 3A and 3B illustrates how a first GUI responds when a user makes directional commands via a cursor control device while the cursor controller is in the second discrete roaming operational state.
Figure 3B:
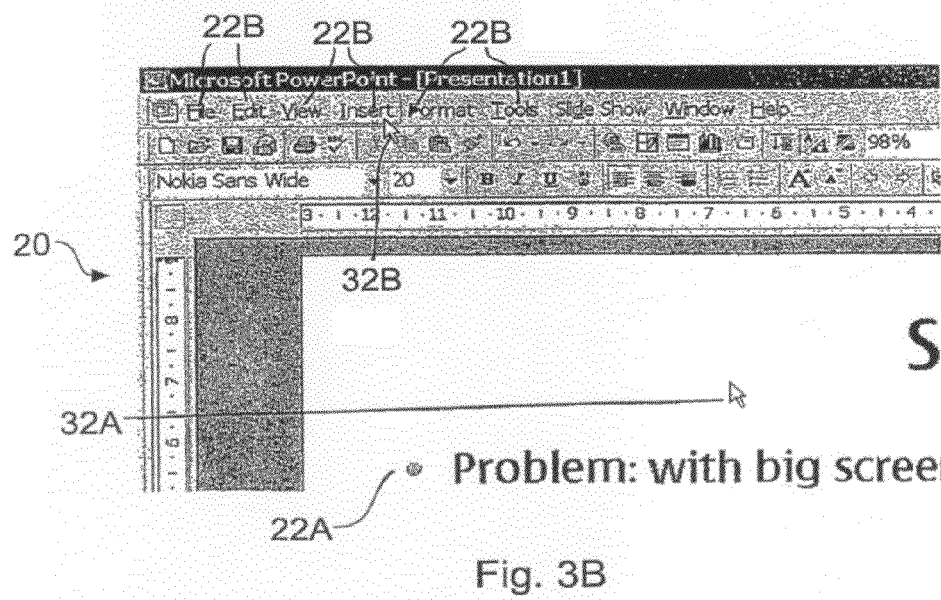

In FIGS. 3A and 3B, a text area 22A is used for example, when selected for the composition of text. A primary cursor 32A is present in this area. This cursor 32A can be moved in a free-roaming manner across the whole of the area 22A by inputting directional commands via the cursor control device 23. A secondary cursor 32B can be moved, by inputting directional commands via the cursor control device 23, in a discrete roaming manner between only the different 'control' areas 22B, namely 'File', 'Edit', 'View', 'Insert', 'Format', 'Tools' etc. Each of these control areas 22B is a control button that is activated by selecting the area.

In one embodiment, when the cursor controller enters the second discrete roaming operational state a secondary cursor 32B is created in addition to the primary cursor 32A which was being used in the preceding first free roaming operational state. The primary cursor 32A remains within the discrete 'text' area 22A, whereas the secondary cursor 32B is initially located at one of the 'control' areas 22B.

During the second discrete roaming operational state, the secondary cursor 32B hops from control button area 22B to control button area 22B in response to directional inputs from the cursor control device 23. In addition, the primary cursor 32A continues to move in a free-roaming manner within the discrete area 22A. A control button can be selected by hopping the secondary cursor 32B to the desired control button area 22B and then performing a selection using the cursor control device 23.

When the cursor controller returns to the first free-roaming operational state, the secondary cursor 32B disappears. The primary cursor 32A may be returned automatically or in response to user control to the location last occupied during the first free-roaming operational state.

In another embodiment, the input from the switch 25 used to toggle the cursor controller from the first free-roaming operational state to the second discrete roaming operational state is the activation of the switch (e.g. pressing a button) and the input from the switch 25 to toggle the cursor controller from the second discrete-roaming operational state to the first free-roaming operational state is the deactivation of the switch (e.g. releasing the button). Thus directional commands, during the second discrete roaming operational state, are input while the switch is activated (e.g. the button is being pressed). When the cursor controller enters the second discrete roaming operational state a secondary cursor 32B is created in addition to the primary cursor 32A which was being used in the preceding first free roaming operational state. The primary cursor 32A remains within the discrete 'text' area 22A, whereas the secondary cursor 32B is initially located at one of the 'control' areas 22B.

During the second discrete roaming operational state, the secondary cursor 32B hops from control button area 22B to control button area 22B in response to directional commands from the cursor control device 23. In addition, the primary cursor 32A continues to move in a free-roaming manner within the discrete area 22A. A control button can be selected by hopping the secondary cursor 32B to the desired control button area 22B and then performing a selection using the cursor control device 23.

When the cursor controller returns to the first free-roaming operational state, the secondary cursor 32B disappears. The primary cursor 32A may be returned automatically or in response to user control to the location last occupied during the first free-roaming operational state.

In the embodiments described in relation to FIGS. 3A and 3B, the primary cursor may be hidden during the second discrete roaming operational state.

Figure 4A:
FIG. 4A illustrates a second GUI while the cursor controller is in a first free-roaming operational state and FIGS. 4B and 4C illustrate how the second GUI responds when a user makes directional commands via a cursor control device while the cursor controller is in the second discrete roaming operational state.
Figure 4B:
Figure 4C:

FIG. 4A illustrates the GUI 20 while the cursor controller is in the first free roaming operational state and FIGS. 4B and 4C illustrate the GUI 20 while the cursor controller is in the second discrete roaming operational state. In FIGS. 4B and 4C the cursor 32A has been moved in a discrete roaming manner to the 'text' area 22A in FIG. 4 and to the 'control' area 22B in FIG. 4C where it is used to move a scrollable widget in a scrollbar.

In the embodiment illustrated in FIGS. 4A, 4B and 4C, the input from the switch 25 used to toggle the cursor controller from the first free-roaming operational state to the second discrete roaming operational state is the activation of the switch 25 (e.g. pressing a button) and the input from the switch 25 to toggle the cursor controller from the second discrete-roaming operational state to the first free-roaming operational state is the deactivation of the switch (e.g. releasing the button). Thus directional commands, during the second discrete roaming operational state, are input while the switch 25 is activated (e.g. the button is being pressed).

During the second discrete roaming operational state, the cursor 32A hops from control area 32B to area 32B with distinct directional commands from the cursor control device 23.

When the cursor controller returns to the first free-roaming operational state, the cursor 32A is returned automatically to the location last occupied during the first free-roaming operational state.

Although embodiments of the present invention have been described in the preceding paragraphs with reference to various examples, it should be appreciated that modifications to the examples given can be made without departing from the scope of the invention as claimed.

For example, although in the examples illustrated in FIGS. 3 and 4 there is only a single area in which a cursor may be moved in a free-roaming manner, this is not essential. In other implementations there may be a multiple discrete areas within which the cursor may be moved in a free-roaming manner. Selection of such a discrete area, while the cursor controller is in the second discrete roaming operational state may enable the movement of a cursor in the selected discrete area in a free-roaming manner.

For example, although the switch is described as a single switch with two states, it may be implemented as a plurality of different switches or different 'positions' of a single switch, where each position/switch is associated with a particular discrete roaming operational state that starts at a particular area 32. The particular area for a particular discrete roaming operational state may be the location of the cursor when the cursor controller was last in that discrete roaming operational state. When cursor controller leaves one of the discrete roaming operational states to re-enter the free-roaming operational state, the location of the cursor may be stored and used to locate the cursor when that operational state is re-entered.

It should also be understood that the operational state switchover may be accompanied by various different ways of presenting the cursor. A single cursor may be used with a same visual representation regardless of the operational state. Primary and secondary cursors may be used, with both being visible at the same time (with only one being moveable), or with only the moveable one being visible at a time. The cursor may be presented as different cursors distinguished by having different appearances. In any event, the user's attention will naturally be drawn to the cursor that is presently moveable by using the cursor control 23. The term cursor should therefore be understood to cover any way of presenting the cursor or cursors when toggling/switching the operational state.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising a processor and a memory storing computer program code, the memory and computer program code being configured to, with the processor, cause the apparatus to:
   receive directional input commands;
   cause a plurality of discrete areas and a cursor to be displayed;
   cause movement of the cursor in response to the received directional input commands; and
   receive user input indicating a change in an operational state of the apparatus, the operational states comprising:
      a first operational state in which the cursor is caused to move, in response to the received directional input commands, within a first discrete area in a free-roaming manner; and
      a second operational state in which the cursor is caused to move, in response to the received directional input commands, in a discrete-roaming manner from discrete area to discrete area.

2. The apparatus as claimed in claim 1, wherein the apparatus is further caused to:
   in response to receiving user input indicating a change in the operational state of the apparatus from the first operational state to the second operational state, cause location data comprising a location of the cursor in the first discrete area to be stored; and
   subsequently locate the cursor in the first discrete area in accordance with the stored location data.

3. The apparatus as claimed in claim 2, wherein the location data further comprises data identifying the first discrete area.

4. The apparatus as claimed in claim 2, wherein the apparatus is further caused to locate the cursor in the first discrete area in accordance with the stored location data in an instance in which the operational state changes from the second operational state to the first operational state.

5. The apparatus as claimed in claim 2, wherein movement in a free roaming manner involves movement of the cursor in a manner that is independent of the location of the cursor within the first discrete area.

6. The apparatus as claimed in claim 1, wherein movement in a free roaming manner involves movement of the cursor a distance on the display that has a constant relationship to a magnitude of an input directional command.

7. The apparatus as claimed in claim 6, wherein the constant relationship is a linearly proportional relationship.

8. The apparatus as claimed in claim 1, wherein movement in a discrete roaming manner involves hopping movement of the cursor in a manner that is dependent on location of the cursor relative to the plurality of discrete areas.

9. The apparatus as claimed in claim 1, wherein movement in a discrete roaming manner involves hopping movement of the cursor to a nearest discrete area in a direction corresponding to an input directional command.

10. The apparatus as claimed in claim 1, wherein the first discrete area is a selected discrete area, wherein the apparatus is further caused to receive selection of the selected discrete area by receiving, in the second operational state, directional input commands causing the cursor to move to the selected discrete area and receiving subsequent user input.

11. The apparatus as claimed in claim 10, wherein receiving selection of the selected discrete area causes performance of a control function in an instance in which the selected discrete area is associated with a control function.

12. The apparatus as claimed in claim 1, wherein the first discrete area is an application window area and is only one of the plurality of discrete areas within which the cursor may be moved in a free-roaming manner.

13. The apparatus as claimed in claim 1 wherein the first discrete area is one of a plurality of discrete areas including a second discrete area within which the cursor may be moved in a free-roaming manner.

14. The apparatus as claimed in claim 13, wherein receiving selection of the second discrete area enables movement of the cursor in the selected discrete area after the cursor controller is returned to the first operational state.

15. The apparatus as claimed in claim 1, further comprising a control device and a switch;
   wherein the control device is configured to receive the directional input commands from a user and the switch is configured to receive the user input indicating a change in an operational state of the apparatus;
   further wherein the control device and the switch are positioned and orientated for operation using different hands of a user.

16. The apparatus as claimed in claim 1, wherein a secondary cursor is created and displayed in the second operational state.

17. An apparatus comprising a processor and a memory storing computer program code, the memory and computer program code being configured to, with the processor, cause the apparatus to:
   operate according to one of two operational states, wherein the operational states comprise:
      a first operational state in which the apparatus causes a cursor to be moved in a display, in response to input directional commands received from a cursor control device, within a first discrete area of the display in a free-roaming manner; and
      a second operational state in which the apparatus causes a cursor to be moved in the display, in response to the input directional commands from the cursor control device, in a discrete-roaming manner from discrete area to discrete area; and
   receive user input comprising an indication to switch between the first operational state and the second operational state.

18. The apparatus as claimed in claim 17, further comprising causing location data recording a current location of the cursor in a first discrete area to be stored in response to receiving an indication to switch from the first operational state to the second operational state.

19. The apparatus as claimed in claim 18, wherein the apparatus is further caused to locate the cursor in the first discrete area in accordance with the stored location data.

20. A method comprising:
   causing a cursor to be moved within a first discrete area of a display in a free-roaming manner in response to received directional input commands;
   detecting a first input from a user;
   causing the cursor to be moved in a discrete-roaming manner from discrete area to discrete area in response to received directional input commands;
   detecting a second input from the user; and
   causing the cursor to be moved within a first discrete area in a free-roaming manner in response to received directional input commands.

21. The method as claimed in claim 20, further comprising: causing a location of the cursor in the first discrete area to be stored in response to the first input from the user.

22. The method as claimed in claim 21 further comprising: locating the cursor in the first discrete area, based on the stored location, in response to the second input from the user.

23. A computer readable non-transitory medium having program code stored thereon, said code being configured to, upon execution, cause an apparatus to at least:
- cause a cursor to be moved within a first discrete area of a display in a free-roaming manner in response to received directional input commands;
- detect a first input from a user;
- cause the cursor to be moved in a discrete-roaming manner from discrete area to discrete area in response to received directional input commands;
- detect a second input from the user; and
- cause the cursor to be moved within a first discrete area in a free-roaming manner in response to received directional input commands.

24. A computer readable non-transitory medium comprising program instructions configured to, upon execution, cause an apparatus to at least:
- receive user input toggling between two cursor control states, wherein the first cursor control state comprises causing a cursor to be moved on a display, in response to input directional commands, in a free-roaming manner and the second cursor control state comprises causing the cursor to be moved on the display, in response to input directional commands, in a discrete-roaming manner.

* * * * *